United States Patent [19]

Deubzer et al.

[11] 4,413,104

[45] Nov. 1, 1983

[54] PROCESS FOR PREPARING ORGANOPOLYSILOXANES AND COPOLYMERS THEREOF

[75] Inventors: Bernward Deubzer, Burghausen; Norbert Egerter, Emmerting; Volker Frey, Burghausen, all of Fed. Rep. of Germany

[73] Assignee: Wacker-Chemie GmbH, Munich, Fed. Rep. of Germany

[21] Appl. No.: 332,140

[22] Filed: Dec. 18, 1981

[30] Foreign Application Priority Data

Feb. 19, 1981 [DE]  Fed. Rep. of Germany ....... 3106186

[51] Int. Cl.$^3$ ............................................ C08F 283/00
[52] U.S. Cl. .................................... 525/479; 525/474; 528/10; 528/14; 528/20; 528/21; 528/22; 528/25; 528/26; 528/27; 528/33; 528/34; 528/38; 528/42; 523/107; 351/160 R
[58] Field of Search .................. 525/474, 479; 528/10, 528/14, 20, 21, 22, 25, 26, 27, 33, 34, 38, 42; 523/107; 351/160 R

[56] References Cited

U.S. PATENT DOCUMENTS

| | | | |
|---|---|---|---|
| 3,127,363 | 3/1964 | Nitzsche et al. | 528/34 |
| 3,847,848 | 11/1974 | Beers | 528/33 |
| 3,890,269 | 6/1975 | Martin | 528/33 |
| 4,075,169 | 2/1978 | Razzano | 528/37 |
| 4,122,247 | 10/1978 | Evans | 528/37 |
| 4,229,548 | 10/1980 | Sattlegger | 528/33 |

*Primary Examiner*—Melvyn I. Marquis

[57] ABSTRACT

A process for preparing organopolysiloxanes having SiC-bonded organofunctional groups, which comprises reacting an organopolysiloxane containing SiC-bonded hydroxyl and/or alkoxy groups and having an average of about 0.85 to 1.8 SiC-bonded monovalent hydrocarbon radicals or halogenated monovalent hydrocarbon radicals for each Si atom, with an organosilicon compound containing alkoxy groups and/or siloxane oxygen groups and at least one SiC-bonded organofunctional radical per molecule in the presence of an organic solvent and a basic catalyst.

The resultant organopolysiloxanes having SiC-bonded organofunctional groups may, for example, be used for preparing modified polymers by copolymerizing the organopolysiloxanes with a monomer containing an aliphatic double bond, such as styrene or hydroxyethyl methacrylate, or by reacting the organopolysiloxanes with an additional polymer such as an epoxy resin. When a monomer, containing an aliphatic double bond is used in the copolymerization, the resultant modified polymers may be used to manufacture hard contact lenses.

9 Claims, No Drawings

PROCESS FOR PREPARING ORGANOPOLYSILOXANES AND COPOLYMERS THEREOF

The present invention relates to a process for preparing organopolysiloxanes and more particularly to a process for preparing organopolysiloxanes having SiC-bonded organofunctional groups.

BACKGROUND OF THE INVENTION

Organopolysiloxane resins having Si-bonded vinyl groups are described in U.S. Pat. No. 4,242,486 to Wacker-Chemie GmbH. These organopolysiloxane resins are prepared by reacting (A) an organopolysiloxane having at least 0.1 percent by weight of Si-bonded hydroxyl groups and at least 50 mol percent of monoorganosiloxane units with (B) an organosiloxane containing from 2 to 10 silicon atoms per molecule and having on the average at least two such hydrocarbon radicals for each silicon atom in which at least one of the siloxanes (A) and/or (B) has an average of at least one SiC-bonded vinyl group per molecule, at a temperature of 90° C. ± 5° C. in the presence of (C) an acid activated clay, in which the water released during the condensation of Si-bonded hydroxyl groups is retained in the mixture.

In contrast to the process described above, the process of this invention can be conducted at temperatures outside the limited temperature range of 90° C. ± 5° C. Also, the process of this invention can be conducted in the presence of a basic catalyst, whereas the process described above was conducted in the presence of an acid activated bleaching clay. Furthermore, the process of this invention utilizes not only organofunctional organosiloxanes, but also organofunctional organosilanes.

Therefore, it is an object of the present invention to provide a process for preparing organopolysiloxanes having SiC-bonded organofunctional groups. Another object of this invention is to provide a process for preparing organopolysiloxanes having SiC-bonded organofunctional groups from organofunctional organosilanes. Still another object of this invention is to provide a process for preparing organopolysiloxanes having SiC-bonded organofunctional groups in the presence of basic catalysts. A further object of the present invention is to provide a process for preparing organopolysiloxanes having SiC-bonded organofunctional groups over a broad temperature range. A still further object of this invention is to provide a process for preparing organopolysiloxanes having SiC-bonded organofunctional groups which may be utilized in manufacturing contact lenses.

SUMMARY OF THE INVENTION

The foregoing objects and others which will become apparent from the following description are accomplished in accordance with this invention, generally speaking, by providing a process for preparing organopolysiloxanes containing SiC-bonded organofunctional groups which comprises reacting an organopolysiloxane containing Si-bonded hydroxyl and/or alkoxy groups and having an average of from 0.85 to 1.8 SiC-bonded monovalent hydrocarbon radicals or halogenated monovalent hydrocarbon radicals per Si atom, with an organosilicon compound containing alkoxy groups and/or siloxane oxygen groups and at least one SiC-bonded organofunctional radical per molecule in the presence of an organic solvent and a basic catalyst.

DETAILED DESCRIPTION OF THE INVENTION

The organopolysiloxanes containing Si-bonded hydroxyl or alkoxy groups and having an average of from 0.85 to 1.8 SiC-bonded monovalent hydrocarbon radicals or halogenated monovalent hydrocarbon radicals per Si atom, are preferably those having units of the general formula

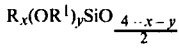

where R represents the same or different monovalent hydrocarbon radicals or halogenated monovalent hydrocarbon radicals, $R^1$ represents hydrogen or the same or different monovalent alkyl radicals, x and y are respectively 0, 1, 2 or 3, with the proviso that x must have an average value of from 0.85 to 1.8, y must have an average value of from 0.01 to 0.4 and the sum of $x+y$ in each unit may not be greater than 3.

Suitable examples of hydrocarbon radicals represented by R are alkyl radicals having from 1 to 18 carbon atoms are the methyl, ethyl, n-propyl isopropyl and 2-ethylhexyl radicals as well as hexyl and octadecyl radicals; alkenyl radicals having from 2 to 5 carbon atoms such as vinyl, allyl, ethylallyl and butadienyl radicals; cycloalkyl radicals such as the cyclohexyl radical; aryl radicals such as the phenyl radical; alkaryl radicals having from 7 to 16 carbon atoms such as the tolyl radicals; and alkaryl radicals having from 7 to 16 carbon atoms, such as the beta-phenylethyl radicals.

Examples of halogenated hydrocarbon radicals represented by R are the 3,3,3-trifluoropropyl radical and chlorobenzene radicals.

It it preferred that at least 20 percent of the number of R radicals consist of phenyl radicals or of alkyl radicals containing from 5 to 18 carbon atoms.

Examples of alkyl radicals represented by $R^1$ are the methyl, ethyl, n-propyl and the isopropyl radicals.

It is preferred that the organopolysiloxanes containing Si-bonded hydroxyl and/or alkoxy groups and having on the average from 0.85 to 1.8 SiC-bonded monovalent hydrocarbon radicals or halogenated monovalent hydrocarbon radicals per Si atom, used in accordance with this invention have an average of from about 10 to 1,000 silicon atoms per molecule and an average of at least 2 Si-bonded hydroxyl and/or alkoxy groups per molecule.

Only one type of organopolysiloxane having Si-bonded hydroxyl and/or alkoxy groups and having an average of from 0.85 to 1.8 SiC-bonded monovalent hydrocarbon radicals, or halogenated hydrocarbon radicals per Si atom, may be used in this invention or a mixture containing at least two different types of organopolysiloxanes, may be used provided that the mixture contains Si-bonded hydroxyl and/or alkoxy groups and has on the average of from 0.85 to 1.8 SiC-bonded monovalent hydrocarbon radicals or halogenated monovalent hydrocarbon radicals per Si atom.

Examples of organosilicon compounds containing alkoxy groups and/or siloxane oxygen groups, i.e., oxygen in the grouping $\equiv$SiOSi$\equiv$, as well as an SiC-bonded organofunctional radical per molecule, are trialkoxysilanes having the general formula $R^2Si(OR^3)_3$, where $R^2$ represents the organofunctional radical and $R^3$ represents the same or different alkyl groups, partial hydrolyzates of such silanes having from 2 to 20 Si atoms per molecule and linear or cyclic organopolysiloxanes having units of the general formula $$R^2R_aSiO_{\frac{3-a}{2}},$$

where R and $R^2$ are the same as above and a is 1 or 2. It is preferred that the organopolysiloxanes have from 2 to 9 silicon atoms per molecule.

The examples cited for the $R^1$ alkyl groups are equally applicable to the $R^3$ alkyl groups.

It is possible to use just one type of such organosilicon compound having an organofunctional radical or a mixture containing at least two types of such organosilicon compounds in the process of this invention.

Organosilicon compounds, especially organopolysiloxanes, which may be used in the process of this invention are those having the following formulas:

$(R^2R_2Si)_2O$, $(R^2R_2SiOSiRR^2)_2O$ and $(R^2RSiO)_3$.

Examples of organofunctional radicals represented by $R^2$ are those of the following formulas $CH_2=CH-$, $CH_2=C(CH_3)COO(CH_2)_3-$, $HS(CH_2)_3-$, $H_2N(CH_2)_2NH(CH_2)_3-$, $CH_2\overset{O}{\overset{/\,\,\backslash}{-}}CHCH_2O(CH_2)_3-$,

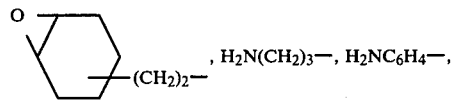, $H_2N(CH_2)_3-$, $H_2NC_6H_4-$, $HO(CH_2)_3-$ and $Cl(CH_2)_3-$.

Examples of silanes, as well as organopolysiloxanes having an organofunctional $R^2$ radical are beta-aminoethyl-gamma-aminopropyltrimethoxysilane, gamma-methacryloxypropyltrimethoxysilane, sym.-di-gamma-hydroxypropyltetramethyldisiloxane, and 1-gamma-hydroxypropyl-1,1,3,3,3-pentamethyldisiloxane.

The ratio between the organosilicon compound containing alkoxy groups and/or siloxane oxygen groups and at least one SiC-bonded organofunctional radical per molecule, and the organopolysiloxane cntaining Si-bonded hydroxyl and/or alkoxy groups and having on the average of from 0.85 to 1.8 SiC-bonded monovalent hydrocarbon radicals or halogenated monovalent hydrocarbon radicals per Si atom, may be varied over a wide range. It is preferred that from 1 to 30 percent by weight of the organosilicon compound containing alkoxy groups and/or siloxane oxygen groups and at least one SiC-bonded organofunctional radical per molecule be used, based on the total weight of the organosilicon compounds used in the process of this invention.

Any organic solvent may be used in the process of this invention in which all of the organosilicon compounds are soluble, at least at the reaction temperature, and which are inert to the other components of the reaction mixture. Aromatic solvents such as benzene, toluene or xylols as well as chlorobenzene are preferred. Additional examples of suitable solvents are alkanes having boiling points in the range of from 120° to 180° C. at 1 bar or about 1 bar; alcohols, esters, ketones, or glycol ethers.

A single organic solvent or mixture of at least two different types of suitable organic solvents may be used in the process of this invention.

It is preferred that the organic solvents be used in an amount of from 40 to 70 percent by weight, based on the total weight of the mixture consisting of the organic solvent, the basic catalyst and the organosilicon compounds.

In the process of this invention, it is possible to use any basic catalyst which has been or could have been used heretofore to promote the condensation of Si-bonded hydroxyl groups with Si-bonded alkoxy groups, or the rearrangement or "equilibration" of siloxane compounds. Examples of preferred basic catalyst are alkali metal carbonates and alkali metal hydroxides. Other preferred basic catalysts are alkali metal alcoholates and alkali metal oxyacylates, such as for example, potassium acetate. The alkali metal may be lithium, sodium, potassium, rubidium or cesium with sodium and potassium being the preferred alkali metals. Other examples of suitable catalysts are potassium methylsiliconate and basic quaternary ammonium compounds, such as tetramethyl ammonium siloxanolate obtained from tetramethyl ammonium hydroxide and octamethylcyclotetrasiloxane.

It is possible to use a single type of basic catalyst or a mixture containing at least two different types of basic catalysts, for example, a mixture of sodium hydroxide and potassium ethylate.

The amount of basic catalyst used may be varied over a wide range. For example an amount of 5 percent by weight, based on the total weight of the mixture consisting of an organic solvent, a basic catalyst and the organosilicon compounds may be used. However, it is preferred that from 10 to 1,000 parts by weight of basic catalyst be used for each million parts by weight of the mixture consisting of the organic solvent, the basic catalyst and the organosilicon compounds.

The reaction is preferably carried out at the reflux temperature of the solvent and at atmospheric pressure. However, if desired, higher or lower temperatures and/or pressures may also be employed in the process of this invention.

When the organosilicon compounds which are to be reacted are free or essentially free of Si-bonded alkoxy groups, then the organopolysiloxanes having SiC-bonded organofunctional groups of this invention may have no more than about 1 percent by weight of Si-bonded hydroxyl groups.

When at least one of the organosilicon reactants contains Si-bonded alkoxy groups, then the organopolysiloxanes prepared in accordance with the process of this invention contain a maximum of about 10 mol percent of Si-bonded alkoxy groups, if a sufficient amount of water was released during the condensation of the Si-bonded hydroxyl groups and/or water was present as such, or in the form for example, of salt hydrates, such as sodium carbonate-decahydrate during the reaction or if water was added to the product obtained and the mixture then heated in the presence of the basic catalyst.

The organopolysiloxanes having SiC-bonded organofunctional groups prepared in accordance with this invention may be used for any and all reactions which heretofore could utilize organopolysiloxanes containing such organofunctional groups. Thus, the organopolysiloxanes having the SiC-bonded organofunctional groups of this invention may be used in preparing modified polymers by copolymerizing the organopolysiloxanes with a monomer containing an aliphatic double bond, or by reacting the organopolysiloxanes with an additional polymer.

The organopolysiloxanes of this invention having at least one SiC-bonded organic group with for example, a methacryloxy radical, may be copolymerized with acrylates, methacrylates, itaconic acid dimethylester, acrylic acid, hydroxyethyl methacrylate, vinyl pyrrolidone or styrene or mixtures containing at least two such monomers, to form clear, hard copolymers which are permeable to gas such as oxygen. These copolymers may be utilized in manufacturing contact lenses.

Also, the organopolysiloxanes prepared in accordance with this invention containing at least one SiC-bonded organic group with an amino and/or imino group may for example be reacted with epoxide resins. Likewise, the organopolysiloxanes prepared pursuant to this invention having at least one $\equiv$COH group may for example be reacted with isocyanates.

EXAMPLE 1

About 90 g of beta-aminoethyl-gamma-aminopropyl-trimethoxy silane and about 0.5 g of anhydrous sodium carbonate are added to about 900 g of a hydrolysate produced from $C_6H_5SiCl_3$ having about 5 percent by weight of Si-bonded hydroxyl groups, a melting point of 53° C. and an average molecular weight of about 1,500 g in 900 g of toluene. The resultant mixture is then heated for 4 hours under reflux. The components which boil up to 150° C. at 1 bar, as well as the water formed during the reaction, are removed by distillation and the product filtered.

The resultant organopolysiloxane contains beta-aminoethyl-gamma-amino-propyl functional groups, with an average molecular weight of about 3,260 and contains a maximum of about 0.5 percent by weight of Si-bonded hydroxyl groups. It is mixed with an equal number of parts by weight of an epoxide resin based on 2,2-bis(4-hydroxyphenyl)propane having an average molecular weight of about 350. The mixture hardens at room temperature, forming a clear uniform film.

EXAMPLE 2

About 90 g of gamma-methacryloxypropyltrimethoxysilane and 0.5 g of anhydrous sodium carbonate are added to a mixture containing 900 g of the $C_6H_5SiCl_3$ hydrolysate described in Example 1 and 900 g of toluene. The resultant mixture is heated for 4 hours under reflux and then filtrated. The components which boil up to 150° C. at 1 bar are removed by distillation.

The organopolysiloxane thus obtained, which contains gamma-methacryloxy propyl groups as organofunctional groups, melts at 123° C.

Two samples are prepared in which 2 g of the resin prepared above are dissolved in 98 g of methylmethacrylate and in the other, about 75 g of the resin are dissolved in 25 g methylmethacrylate. Following the addition of 0.1 g dicyclohexylperoxydicarbonate to each sample, the respective mixtures are heated to 40° C. for 120 minutes. A clear, hard copolymer is obtained in each sample.

EXAMPLE 3

About 30 g of gamma-methacryloxypropyltrimethoxysilane and 0.5 g of anhydrous sodium carbonate are added to the mixture containing to 240 g of the $C_6H_5SiCl_3$ hydrolysate described in Example 1, 360 g of a diorganopolysiloxane having an Si-bonded hydroxyl group in each of its terminal units, consisting of 75 mol percent of dimethylsiloxane units and 25 mol percent of vinylmethylsiloxane units and a viscosity of about 100 $mm^2 s^{-1}$ and 900 g of toluene. The resultant mixture is boiled under reflux for 8 hours, then filtered and the components boiling up to 150° C. at 1 bar are removed by distillation.

A clear, viscous organopolysiloxane is obtained containing gamma-methacryloxypropyl organofunctional groups.

EXAMPLE 4

To about 900 g of an organopolysiloxane consisting of 66.66 mol percent of phenylmethylsiloxane units and 33.34 mol percent of monophenylsiloxane units with 14 percent by weight of Si-bonded methoxy groups and having an average molecular weight of 800 in 600 ml of toluene, are added 90 g of sym-di-gamma-hydroxy-propyltetramethyldisiloxane and 0.15 g potassium hydroxide in 100 g of water. The resultant mixture is heated to boiling under reflux for 6 hours, cooled and filtered. The filtrate is distilled and those constituents boiling at temperatures up to 120° C. at approximately 16 mbar are removed. The H-NMR spectrum shows that the liquid obtained contains 13 percent by weight of SiC-bonded hydroxypropyl groups.

EXAMPLE 5

A 50 percent by weight solution of the organopolysiloxane prepared in accordance with Example 3 in methylmethacrylate and which contains gamma-methacryloxy groups as organofunctional groups, is mixed with 2 percent by weight of dicyclohexylperoxydicarbonate based on based on the weight of the organopolysiloxane, and dried over anhydrous sodium sulfate. It is then filtered and allowed to stand for 16 hours at 15° C. in a nitrogen atmosphere. The composition is then heated to 110° C. within 8 hours and then cooled. A clear hard material is obtained.

Clear, hard materials are also obtained when each of the following materials are substituted for the methylmethacrylate used in the previously described example:
(a) a mixture of methylmethacrylate and styrene,
(b) a mixture of methylmethacrylate and itaconic acid dimethylester,
(c) a mixture of methylmethacrylate and acrylic acid,
(d) a mixture of methylmethacrylate and hydroxyethyl methacrylate.

What is claimed is:
1. A process for preparing an organopolysiloxane having SiC-bonded organofunctional groups which comprises reacting an organopolysiloxane containing Si-bonded groups selected from the class consisting of hydroxyl groups, alkoxy groups and mixtures thereof and having an average of from 0.85 to 1.8 SiC-bonded radicals selected from the class consisting of monovalent hydrocarbon radicals and halogenated monovalent hydrocarbon radicals per silicon atom, with a organosilicon compound containing Si-bonded groups selected from the class consisting of alkoxy groups, ≡Si—O—Si≡ groups and mixtures thereof, and at least one SiC-bonded organofunctional radical per molecule, in which the SiC-bonded organofunctional radical is selected from the group consisting of

CH$_2$=CH—, CH$_2$=C(CH$_3$)COO(CH$_2$)$_3$—, HS(CH$_2$)$_3$—,

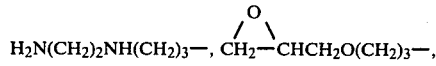

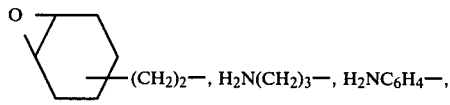

HO(CH$_2$)$_3$— and Cl(CH$_2$)$_3$— in the presence of an organic solvent and a basic catalyst selected from the group consisting of alkali metal carbonates, alkali metal hydroxides, alkali metal alcoholates, alkali metal oxyacylates, potassium methylsiliconate and quaternary ammonium compounds at the reflux temperature of the solvent at atmospheric temperature.

2. The process of claim 1, wherein the basic catalyst is an alkali metal carbonate.

3. The process of claim 1, wherein the organic solvent is present in an amount of from 40 to 70 percent by weight based on the total weight of the organic solvent, the basic catalyst and the organosilicon compounds.

4. The process of claim 1, wherein the basic catalyst is present in an amount of from 10 to 1,000 parts by weight based on the total weight of the organic solvent, basic catalyst and the organosilicon compounds.

5. A process for preparing a modified organopolysiloxane polymer which comprises copolymerizing a monomer or polymer containing aliphatic double bonds with an organopolysiloxane which is obtained from the reaction of an organopolysiloxane having Si-bonded groups selected from the class consisting of hydroxyl groups, alkoxy groups and mixtures thereof and having an average of from 0.85 to 1.8 SiC-bonded radicals selected from the class consisting of monovalent hydrocarbon radicals and halogenated monovalent hydrocarbon radicals per silicon atom and an organosilicon compound having Si-bonded groups selected from the class consisting of alkoxy groups, ≡Si—O—Si≡ groups and mixtures thereof, and at least one SiC-bonded organofunctional radical per molecule, in which the SiC-bonded organofunctional radical is selected from the group consisting of

CH$_2$=CH—, CH$_2$=C(CH$_3$)COO(CH$_2$)$_3$—, HS(CH$_2$)$_3$—,

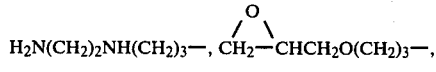

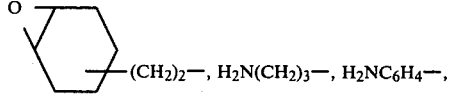

HO(CH$_2$)$_3$— and Cl(CH$_2$)$_3$— in the presence of an organic solvent and a catalyst selected from the group consisting of alkali metal carbonates, alkali metal hydroxides, alkali metal alcoholates, alkali metal oxyacylates, potassium methylsiliconate and quaternary ammonium compounds at the reflux temperature of the solvent at atmospheric temperature.

6. The process of claim 5, wherein at least one monomer is selected from the group consisting of an acrylate, methacrylate, itaconic acid dimethyl ester, acrylic acid, hydroxyethyl methacrylate, vinyl pyrrolidone and styrene and the organopolysiloxane contains at least one methacryloxy radical as the SiC-bonded organofunctional group.

7. The modified organopolysiloxane polymer prepared in accordance with the process of claim 5.

8. The modified organopolysiloxane polymer prepared in accordance with the process of claim 6.

9. A contact lens prepared from the organopolysiloxane polymer obtained from the process of claim 1.

* * * * *